United States Patent
Hernandez-Marti (10) Patent No.: US 9,063,241 B2
(45) Date of Patent: Jun. 23, 2015

(54) POWER AND TELEMETRY SIGNAL TRANSMISSION ON CABLE

(71) Applicant: SCHLUMBERGER TECHNOLOGY CORPORATION, Sugar Land, TX (US)

(72) Inventor: Ramon Hernandez-Marti, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 255 days.

(21) Appl. No.: 13/658,311

(22) Filed: Oct. 23, 2012

(65) Prior Publication Data

US 2014/0111350 A1    Apr. 24, 2014

(51) Int. Cl.
*G01V 3/00* (2006.01)
*G01V 1/22* (2006.01)

(52) U.S. Cl.
CPC ... *G01V 3/00* (2013.01); *G01V 1/22* (2013.01)

(58) Field of Classification Search
CPC .................................. H01V 3/00; H04H 9/00
USPC ...................... 340/854.9, 854.4–854.6, 853.1, 340/885.7–855.9
See application file for complete search history.

(56) References Cited

U.S. PATENT DOCUMENTS

| | | | |
|---|---|---|---|
| 4,720,996 A * | 1/1988 | Marsden et al. | 73/152.26 |
| 6,469,363 B1 | 10/2002 | Delpech et al. | |
| 7,259,689 B2 | 8/2007 | Hernandez-Marti et al. | |
| 7,312,720 B2 | 12/2007 | Dodge et al. | |
| 8,130,118 B2 * | 3/2012 | Hall et al. | 340/853.7 |

* cited by examiner

*Primary Examiner* — Tai T Nguyen
(74) *Attorney, Agent, or Firm* — Cathy Hewitt; Kenneth L. Kincaid (57) ABSTRACT

Among other things, a wireline assembly and a technique for providing power to and/or for communicating with one or more tools downhole in a wellbore are provided. The wireline assembly comprises a wireline cable comprising six primary conductors arranged about a center conductor to concurrently transmit power and telemetry signals. A power signal may be transmitted using a first propagation mode and a telemetry signal may be transmitted using a second/different propagation mode. For example, according to the first propagation mode, three adjoining primary conductors provide an active path for a power signal and a different three adjoining primary conductors provide a return path for the power signal, while, according to the second propagation mode, a first pair of primary conductors provides an active path and a second pair of primary conductors provides a return path for the telemetry signal.

19 Claims, 8 Drawing Sheets

POWER AND TELEMETRY SIGNAL TRANSMISSION ON CABLE

CROSS-REFERENCE TO RELATED APPLICATIONS

None.

FIELD OF THE INVENTION

Aspects relate to power transmission on cables. More specifically, aspects relate to power and telemetry signal transmission on downhole cables.

BACKGROUND INFORMATION

New oil and gas wells are routinely being constructed during the exploration and/or extraction of oil and gas to keep pace with the demand for gas and petroleum-based products. These wells are constructed by drilling a wellbore into the earth and encasing the wellbore with steel pipe and/or cement, for example. Such wellbores may be miles in length and may have a vertical and/or a horizontal component to them. To accurately drill the wellbore and/or to reduce health and environmental risks during the drilling, production, and/or abandonment stages, the well is routinely surveyed via electronic equipment that is placed within the wellbore.

Wireline logging generally refers to the surveying of oil or gas wells to determine their geological, petro-physical, and/or geophysical properties using electronic measuring equipment. The electronic measuring equipment is conveyed into the wellbore with a wireline cable configured to provide power and/or a pathway for communication (e.g., via electrical telemetry) between the surface and downhole electronic measuring equipment (e.g., located at the end of the wireline cable). Such electronic measuring equipment uses electrical, acoustical, nuclear, and/or imaging tools to, among other things, stimulate formations and/or fluids within the wellbore.

BRIEF DESCRIPTION OF THE DRAWINGS

Embodiments of power and/or telemetry signal transmission on cable are described with reference to the following figures. The same numbers are used throughout the figures to reference like features and components.

DETAILED DESCRIPTION

The claimed subject matter is now described with reference to the FIGS., wherein like reference numerals are generally used to refer to like elements. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

The present disclosure relates to the transmission of a power signal and/or a telemetry signal over a wireline assembly. The wireline assembly may comprise a wireline cable, a power source, a first telemetry transceiver, and a second telemetry transceiver. The wireline cable may comprise a set of six primary conductors and a center conductor. The power source may be configured to transmit a power signal over the wireline cable using the six primary conductors excited according to a first propagation mode. The first telemetry transceiver may be configured to transmit and/or receive a first telemetry signal over the wireline using at least some of the six primary conductors according to a second propagation mode that is different than the first propagation mode. The second telemetry transceiver may be configured to transmit and/or receive a second telemetry signal over the wireline using at least the center conductor.

Moreover, in one embodiment, the wireline assembly may also comprise a first transformer having a first primary winding, a first secondary winding, and a second secondary winding. Connected to a center tap of the first secondary winding may be the power source and at least one of the primary conductors. The power source may also be connected to a center tap of the second secondary winding, as may at least one of the primary conductors (e.g., which may be a different primary conductor than the primary conductor to which the center tap of the first secondary winding is connected).

Figure 1:
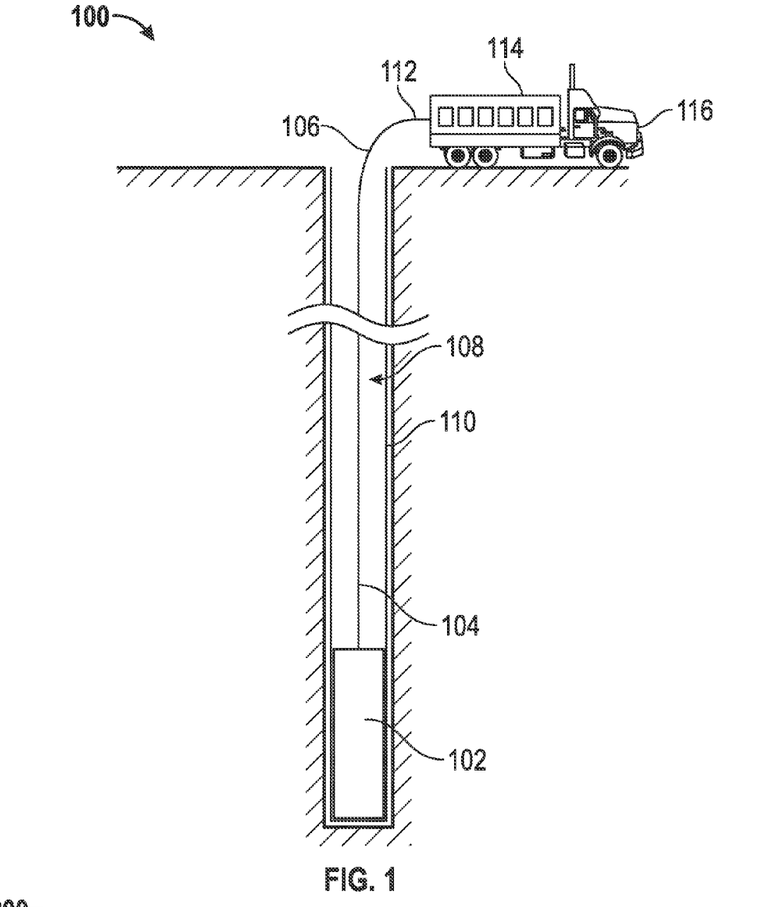
FIG. 1 illustrates select components of an example environment for a wireline assembly.

Turning now to the drawings, FIG. 1 illustrates select components of an example environment for a wireline assembly 100 such as may be suitable for wireline logging, for example. The wireline assembly 100 comprises a tool string 102 connected to a first end 104 (e.g., a distal end) of a wireline cable 106 that is inserted into a wellbore 108. A casing 110, such as steel and/or cement, for example, may line some or all of the wellbore 108. A second end 112 (e.g., a proximal end) of the wireline cable 106 may be connected to a surface unit 114 positioned on a vehicle 116, for example, at the surface of the wellbore 108. The wellbore 108 and/or the wireline cable 106 may extend to a depth of 10,000 meters or more below the surface, for example.

The tool string 102 may comprise electronic measuring equipment, also referred to herein as logging tools, for example, for taking various measurements of earth adjacent the wellbore and/or for taking various measurements pertaining to the wellbore itself (e.g., such as information pertaining to the casing 110 that lines some or all of the wellbore 108). Such electronic measuring equipment may comprise, among other things, gamma-ray emitters/receivers, caliper devices, resistivity-measuring devices, neutron emitters/receivers, and/or the like, which are used to measure/sense characteristics of the formations adjacent the well and/or measure/sense characteristics of the wellbore 108. The wireline cable 106 may connect the tool string 102 with one or more electrical power sources, telemetry transceivers (e.g., modems), and/or data analysis systems at the surface of the earth and/or may provide structural support to the tool string 102 as it is lowered and/or raised through the wellbore 108.

Figure 2:
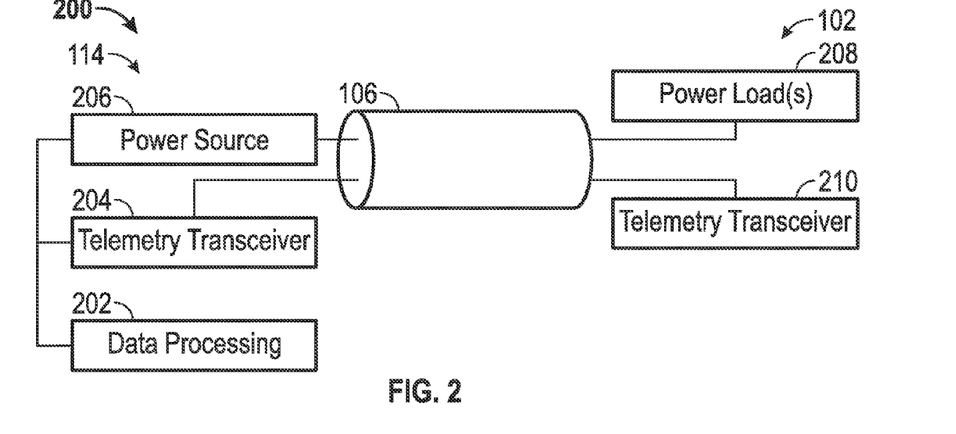
FIG. 2 illustrates select components of an example environment for a wireline assembly.

FIG. 2 illustrates select components of another example environment for a wireline assembly 200 (e.g., 100 in FIG. 1) such as may be suitable for wireline logging. The example wireline assembly 200 comprises the surface unit 114, the wireline cable 106, and the tool string 102, which may be located downhole relative to the surface unit 114.

The surface unit 114 comprises a data processing/analysis system 202 (e.g., a computer), a first telemetry transceiver 204, and a power source 206. The power source 206 is connected to the wireline cable 106 and is configured to provide power signals to one or more power loads 208 of the tool string 102 via the wireline cable 106. Such power loads 208 may comprise, among other motors, actuators, telemetry circuits, control circuits, and/or the like comprised within the tool string 102 and/or comprised within other downhole assemblies. In one embodiment suitable for use with a wireline cable 106, the power source 206 may be configured to produce a downhole voltage of approximately 650 Vdc. The amount of power delivered to the power load(s) 208 from the power source 206 via the wireline cable 106 may depend upon, among other things, a distance between the power load(s) 208 and the power source 206 and/or a gauge of wire through which the power is transferred. For example, an AWG16 cable may deliver approximately 3 kW of DC power downhole when the wireline cable 106 is approximately 35 kft in length. More generally, a maximum power that can be delivered to the power load(s) 208 is $W=V_c^2/(4*R_c)$, where $V_c$ is a maximum voltage between conductor phases and $R_c$ is the resistance of a complete path. The more conductors of the wireline cable 106 there are in parallel, the higher the maximum power that can be delivered, for example. The maximum power may be realized, for example, when a ratio of the voltage at the power load(s) 208 to the line current equals $R_c$.

The first telemetry transceiver 204 is also connected to the wireline cable 106 and is configured to transmit telemetry signals to a first telemetry transceiver 210 of the tool string 102 and/or to receive telemetry signals from the first telemetry transceiver 210 of the tool string 102 via the wireline cable 106. As may be described in more detail below, the first telemetry transceivers 204, 210 may be configured to transmit the telemetry signals over the same wireline cable 106 as the power signals because the first telemetry transceivers 204, 210 may utilize a different propagation mode than the power source 206.

The data processing/analysis system 202 is operably coupled to the power source 206 and the first telemetry transceiver 204. The data processing/analysis system 202 may be configured to control the application of power and/or control signals to devices in the tool string 102 for the purpose of causing the tool string 102 to acquire measurements, for example. Such measurements may be indicative of characteristics or conditions within the earth adjacent the wellbore 108 and/or may be indicative of characteristics or conditions of the wellbore 108 (e.g., such as conditions of a casing of the wellbore 108). The measurements may be communicated from downhole to the surface using the first telemetry transceivers 204, 210 and/or using another set of telemetry transceivers, for example.

Figure 3:
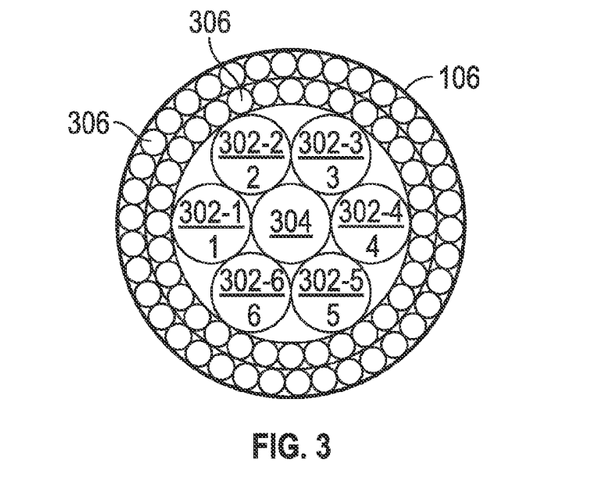
FIG. 3 illustrates a cross-sectional view of an example wireline cable.

Turning now to FIG. 3, a cross sectional view of the wireline cable 106 is illustrated. The example wireline cable 106 is a heptacable comprising a set of six primary conductors 302 arranged about a center conductor 304. In one embodiment, such an arrangement of the six primary conductors 302 may be a helical arrangement, where the six primary conductors 302 are positioned about the circumference of the center conductor 304. In the instant application, for purposes of clarity, the six primary conductors 302 are respectively assigned a numerical value and arranged sequentially, such that a third primary conductor 302-3 follows a second primary conductor 302-2 and precedes a fourth primary conductor 302-4 (e.g., the third primary conductor 302-3 is adjacent the second primary conductor 302-2 and the fourth primary conductor 302-4), the fourth primary conductor 302-4 follows the third primary conductor 302-3 and precedes a fifth primary conductor 302-5 (e.g., the fourth primary conductor 302-4 is adjacent the third primary conductor 302-3 and the fifth primary conductor 302-5), etc. It may be appreciated that given that there are six primary conductors 302, in an embodiment where the primary conductors are arranged substantially helically, a sixth primary conductor 302-6 may be followed by the first primary conductor 302-1 (e.g., to complete the helical arrangement) (e.g., such that the first primary conductor 302-1 is adjacent the sixth primary conductor 302-6 and the second primary conductor 302-2).

In the depicted embodiment, the six primary conductors 302 and the center conductor 304 are substantially equal in diameter. However, in another embodiment one or more conductors may differ in diameter from one or more other conductors. For example, the six primary conductors 302 may be different in diameter relative to the center conductor 304 (e.g., although such an arrangement may lead to a mechanically unstable core and/or may require stabilizing filler members).

The primary conductors 302 are configured to facilitate the transmission of power signals and telemetry signals through the wireline cable 106. Such primary conductors 302 may be constructed of stranded copper, copper alloy conductors, and/or other electrically conductive material(s). Moreover, respective primary conductors 302 may be insulated with a thermoplastic or thermoset material such as Teflon or other dielectric materials, for example. It may be appreciated that the foregoing suggested construction is merely provided as an example and is not intended to limit the scope of the application, including the scope of the claims. For example, in another embodiment, one or more of the primary conductors 302 may be constructed of a solid copper conductor and/or an aluminum conductor, for example. The center conductor 304 may be comprised of a same composition as the primary conductors 302 or may be comprised of a different composition.

In one embodiment, the primary conductors 302 and center conductor 304 are glued or otherwise adhered together and wrapped in a protective tape (not shown). One or more layers of armor 306, such as steel wire, may surround and/or enclose the primary conductors 302 and center conductor 304. Such armor 306 may be configured to protect the primary conductors 302 and/or center conductor 304, to provide structural support for a tool string 102 connected to the wireline cable 106 as it is lowered and/or raised in a wellbore 108, and/or to provide a ground for a power load(s) of the tool string 102, for example.

Figure 4:
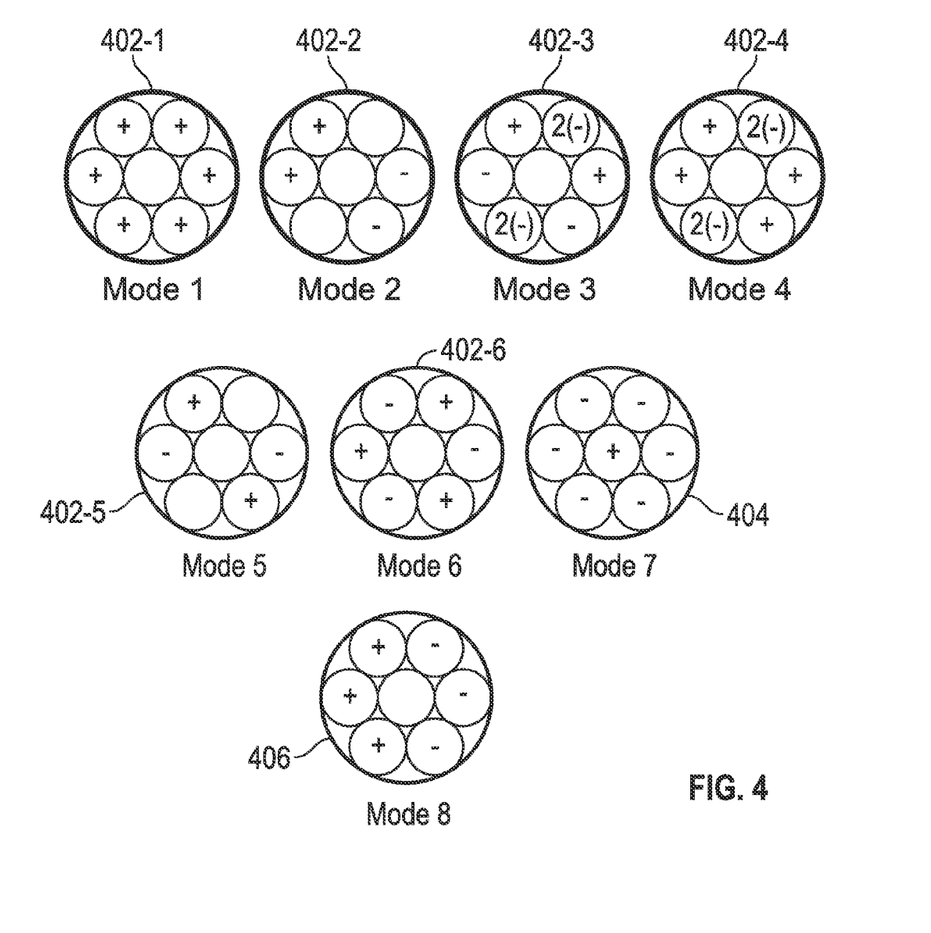
FIG. 4 illustrates example propagation modes for transmitting power signals and telemetry signals via a wireline cable.

FIG. 4 illustrates propagation modes 402, 404, 406 of the primary conductors for a heptacable as illustrated in FIG. 3. A first six propagation modes may be said to be natural propagation modes 402, Mode 7 404 is a modified form of Mode 1 (e.g., as described below), and Mode 8 406 may be said to be a (linear) combination of two or more natural propagation modes (e.g., and thus derived from the natural propagation modes). In the illustrated embodiments, the "+" symbol illustrates an active path (e.g., or positive polarity) and the "−" symbol illustrates a return path (e.g., or negative polarity).

The natural propagation modes 402 are orthogonal to one another. Further, Mode 7 404 and Mode 8 406 may be orthogonal to one another and/or may be respectively orthogonal to at least some of the natural propagation modes 402. Such modes enable two or more different signals (e.g., such as a power signal and a telemetry signal) to share a transmission path (e.g., share one or more same conductors within the cable). For example, a power signal may be transmitted using a first propagation mode (e.g., Mode 8 406) while a telemetry signal is concurrently transmitted using a second propagation mode (e.g., such as Mode 5 402-5 or another natural propagation mode 402 (e.g., except for modes 3 and 6 in an embodiment where Mode 8 406 is derived from a combination of Mode 3 402-3 and Mode 6 402-6 as described below)). In this way, signals concurrently propagated over the wireline cable 300 using two different orthogonal propagation modes will generate substantially less cross talk than signals that are propagated using propagation modes that are not orthogonal.

In Mode 1 402-1, the six primary conductors 302 are active paths for a signal being transmitted. Thus, Mode 1 402-1 implies that a return path for the signal is provided either via the armor 306 of the wireline cable 106 or through a center conductor 304. Mode 7 404 is a modified form of the first natural propagation mode 402-1 in which the center conductor provides an active path for a signal and the primary conductors 302 provide a return path for the signal. Mode 8 406 may be derived from a linear combination of Mode 3 402-3 and Mode 6 402-6 (e.g., ⅔ Mode 3 402-3 minus ⅓ Mode 6 402-6). It may be appreciated that in Mode 8 406, the magnitude of respective paths is substantially equal, whereas in natural propagation Mode 3 402-3 at least one active path and one return path have a magnitude that is approximately two times a magnitude of other primary conductors.

Figure 5:
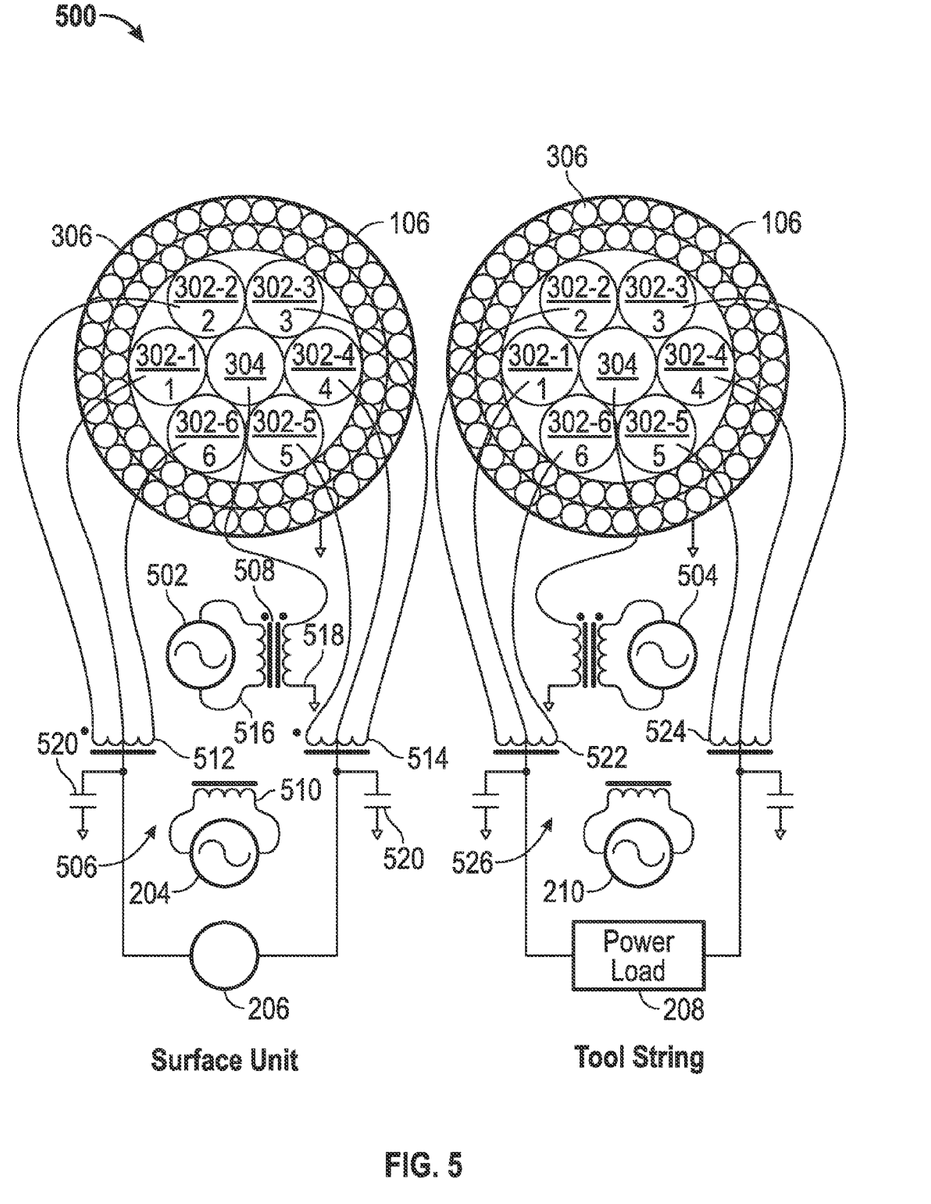
FIG. 5 illustrates select components of an example wireline assembly.

As may be described further with respect to FIG. 5, the power source 206 may be configured to excite the six primary conductors 302 using a first propagation mode (e.g., Mode 8 406), and the first telemetry transceiver 204 may be configured to excite at least some of the six primary conductors 302 using a second propagation mode (e.g., one of the six natural propagation modes 402 that were not utilized to derive Mode 8 406 and/or Mode 7 404). In one embodiment, a second telemetry transceiver (e.g., 502 in FIG. 5) may be configured to excite at least some of the six primary conductors 302-6 and/or the center conductor 304 using a third propagation mode (e.g., another one of the six natural propagation modes 402 and/or Mode 7 404).

It may be appreciated that has used herein "excite" is intended to describe both active paths and return paths. Thus, when it is stated that the power source 206 is configured to excite the six primary conductors 302, it is meant that the six primary conductors 302 are utilized by the power source 206 for the transmission of a power signal. In such an embodiment, some of the six primary conductors 302 may be utilized for an active path while some of the six primary conductors 302 may be utilized for a return path, for example.

FIG. 5 illustrates an example embodiment of select components of an example wireline assembly 500 (e.g., 200 in FIG. 2) for use with heptacable (e.g., a wireline cable 106 comprising 6 primary conductors and a center conductor) as provided for herein. The elements depicted on the left side of FIG. 5 represent an example configuration of the surface unit 114 while the elements depicted on the right side of FIG. 5 represent an example configuration at the tool string 102. More particularly, FIG. 5 illustrates how the surface unit 114 and the tool string 102 may interface with the wireline cable 106 that couples the surface unit 114 to the tool string 102.

The surface unit 114 of the example assembly 500 comprises, among other things, the power source 206, the first telemetry transceiver 204, and a second telemetry transceiver 502, respectively coupled to the wireline cable 106. The power source 206 may be implemented as a DC and/or an AC power source (e.g., the power source 206 may provide DC current, AC current, or both).

The surface unit 114 further comprises a first transformer 506 and a second transformer 508. The first transformer 506 comprises a primary winding 510, a first secondary winding 512, and a second secondary winding 514 and is configured to facilitate the transmission of both telemetry signals and power signals through shared primary conductors. The second transformer 508 comprises a second primary winding 516 and a third secondary winding 518 and is configured to facilitate the transmission of telemetry signals.

With respect to the first transformer 506, terminals of the primary winding 510 are connected to the first telemetry transceiver 204. Terminals of the first secondary winding 512 are connected to the second primary conductor 302-2 and to the sixth primary conductor 302-6, and the terminals of the second secondary winding 514 are connected to the third primary conductor 302-3 and to the fifth primary conductor 302-5. A center tap of the first secondary winding 512 is connected to the first primary conductor 302-1 and to a positive electrode of the power source 206. A center tap of the second secondary winding 514 is connected to the fourth primary conductor 302-4 and to a return electrode of the power source 206. In the illustrated embodiment, the number of turns in the primary winding 510 is equal to the number of turns in the first secondary winding 512 and in the second secondary winding 514. However, in another embodiment, the primary winding 510 may have a different number of turns than the first secondary winding 512 and/or the second secondary winding 514, for example.

With respect to the second transformer 508, terminals of the second primary winding 516 are connected to the second telemetry transceiver 502, and terminals of the third secondary winding 518 are connected to the center conductor 304 to provide an active path and to ground (e.g., or to the armor 306) to provide a return path. In another embodiment, the terminal connected to ground may instead be connected to one or more of the six primary conductors 302 (e.g., to provide a return path as illustrated by Mode 7 404 in FIG. 4). In the illustrated embodiment, the number of turns in the second primary winding 516 is equal to the number of turns in the third secondary winding 518. However, in another embodiment, the second primary winding 516 may have a different number of turns than the third secondary winding 518.

The first telemetry transceiver 204 (represented as an AC voltage source) is connected to the primary winding 510 of the first transformer 506. A positive electrode of the first secondary winding 512 (indicated by the dot) is connected to the second primary conductor 302-2 while a return electrode of the first secondary winding 512 is connected to the sixth primary conductor 302-6. A positive electrode of the second secondary winding 514 is connected to the fifth primary conductor 302-5 while a return electrode of the second secondary winding 514 is connected to the third primary conductor 302-3. In this configuration, the first telemetry transceiver 204 excites the second primary conductor 302-2, the third primary conductor 302-3, the fifth primary conductor 302-5, and the sixth primary conductor 302-6 using propagation Mode 5 402-5 in FIG. 4. That is, with respect to a telemetry signal sent or received by the first telemetry transceiver 204 (e.g., referred to herein as a first telemetry signal), the second primary conductor 302-2 and the fifth primary conductor 302-5 provide for an active path for the first telemetry signal and the third primary conductor 302-3 and the sixth primary conductor 302-6 provide for a return path for the first telemetry signal. Thus, a first pair of primary conductors (e.g., 302-2, 302-5), diametrically opposite one another relative to the center conductor 304, provides an active path and a second pair of primary conductors (e.g., 302-3, 302-6), diametrically opposite one another relative to the center conductor 304, provides a return path for the first telemetry signal.

The second telemetry transceiver 502 (e.g., represented as an AC voltage source) is connected to the second primary winding 516 of the second transformer 510. A positive electrode of the third secondary winding 518 is connected to the center conductor 304 while a return electrode may be connected to ground, to the six primary conductors 302, and/or to armor 306, for example. Where the return electrode is connected to the six primary conductors 302, the second telemetry transceiver 502 may excite the six primary conductors 302 and the center conductor 304 using propagation Mode 7 404 in FIG. 4, for example. That is, in one embodiment, with respect to a telemetry signal sent or received by the second telemetry transceiver 502 (e.g., referred to herein as a second telemetry signal), the center conductor 304 of the wireline cable 106 may provide an active path for the second telemetry signal and the six primary conductors 302 may provide a return path for the second telemetry signal, for example. In another embodiment, the center conductor 304 may provide for the active path and the armor 306 may provide for the return path for the second telemetry signal, for example.

The power source 206 is connected to a center tap of the first secondary winding 512 and a center tap of the second secondary winding 514 of the first transformer 506. Specifically, in the illustrated embodiment, a positive electrode of power source 206 is connected to the center tap of the first secondary winding 512 while a return electrode of power source 206 is connected to the center tap of the second secondary winding 514. In this configuration, the power signal produced by the power source 206 is delivered in parallel to the first primary conductor 302-1, the second primary conductor 302-2, and the sixth primary conductor 302-6, respectively connected to first secondary winding 512, for example. In such a configuration, the return path for the power signal may be a parallel combination of the third primary conductor 302-3, the fourth primary conductor 302-4, and the fifth primary conductor 302-5, respectively connected to second secondary winding 514, for example. Thus, the power signal may be propagated through the primary conductors 302 according to propagation Mode 8 406 in FIG. 4, for example. That is, three adjoining primary conductors may provide for an active path and three other adjoining primary conductors may provide for a return path for a power signal.

The primary conductors 302 are configured to at least provide a transmission path for a power signal produced by the power source 206 and to provide a transmission path for a first telemetry signals between the first telemetry transceiver 204 of the surface unit 114 and a first telemetry transceiver 210 of the tool string 102. To accommodate the power signal and the telemetry signal over the primary conductors 302, the shared path may be excited using orthogonal propagation modes. That is, a first propagation mode may be utilized to provide a power path to deliver the power signal and a second propagation mode may be utilized to provide a first telemetry path for the transmission of the first telemetry signal. A third propagation mode may be utilized to provide a second telemetry path for transmission of the second telemetry signal.

The implementation depicted in FIG. 5 shows a configuration for transmitting power signals and/or telemetry signals according to the foregoing propagation modes. For example, with respect to the first propagation mode utilized to provide a path for delivering the power signal (e.g., Mode 8 406), three adjoining primary conductors (e.g., the first primary conductor 302-1, the second primary conductor 302-2, and the sixth primary conductor 302-6) are configured to provide an active path for a power signal generated by the power source 206 and a different three adjoining primary conductors (e.g., the third primary conductor 302-3, the fourth primary conductor 302-4, and the fifth primary conductor 302-5) are configured to provide a return path for the power signal.

With respect to the second propagation mode utilized to provide a first telemetry path for delivering the first telemetry signal (e.g., Mode 5 402-5), a first pair of the six primary conductors (e.g., the second primary conductor 302-2 and the fifth primary conductor 302-5) may be configured to provide an active path for the first telemetry signal and a second pair of six primary conductors (e.g., the third primary conductor 302-3 and the sixth primary conductor 302-6) may be configured to provide a return path for the first telemetry signal. As illustrated in FIG. 4, according to Mode 5 402-5, a first primary conductor of the first pair (e.g., the second primary conductor 302-2) is diametrically opposite a second primary conductor of the first pair (e.g., the fifth primary conductor 302-5) relative to a center conductor 304 and a first primary conductor of the second pair (e.g., the third primary conductor 302-3) is diametrically opposite a second primary conductor of the second pair (e.g., the sixth primary conductor 302-6) relative to the center conductor 304.

In the illustrated embodiment, a third propagation mode (e.g., Mode 7 404 and/or a modified Mode 1 402-1) may be utilized to provide a second telemetry path for delivering the second telemetry signal (e.g., between the second telemetry transceiver 502 of the surface unit and the second telemetry transceiver 504 of the tool string). A central conductor 304 of the wireline cable 106 may provide an active path for the second telemetry signal and the primary conductors 302 may provide a return path for the second telemetry signal (e.g., according to Mode 7 404) through capacitors 520 and/or armor 306 may provide the return path (e.g., according to modified Mode 1, wherein the center conductor 304 acts as the active path as opposed to the primary conductors 302). It may be appreciated that capacitors 520 may correspond to a low impedance at one or more telemetry frequencies and a large impedance at one or more frequencies of the power source 206 (e.g., particularly when the power source 206 provides DC current).

The right hand side of FIG. 5 depicts the downhole configuration, illustrating an interface between the wireline cable 106 and a tool string 102. It may be appreciated that the downhole side is substantially identical to the surface unit except that the power source 206 is replaced with a power load 208. Thus, for purposes of brevity, the tool string 102 may not be described in substantial detail. It may suffice to provide that the first telemetry transceiver 210 of the tool string 102 communicates with the first telemetry transceiver 204 of the surface unit using the second primary conductor 302-2, the third primary conductor 302-3, the fifth primary conductor 302-5, and the sixth primary conductor 302-6. The second transceiver 504 of the tool string 102 communicates with the second telemetry transceiver 502 via the center conductor 304. The power source 206 provides power to motors, actuators, telemetry circuits, and/or other devices collectively represented as power load 208, which is connected to a center tap of a first secondary winding 522 and a center tap of a second secondary winding 524 of a first transformer 526 on the tool string 102.

Figure 6:
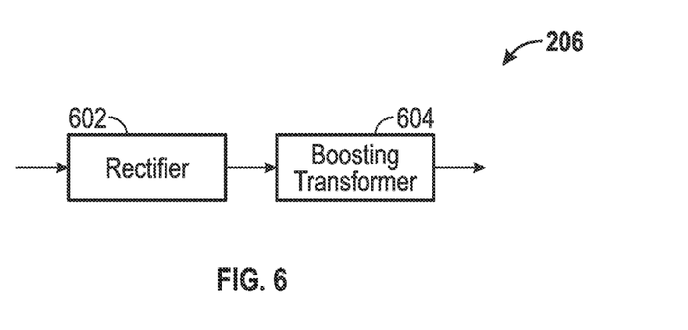
FIG. 6 illustrates an example power source.

FIG. 6 illustrates a component block diagram of an example power source 206 configured to supply power to a tool string 102 via a wireline cable 106. It may be appreciated that the illustrated power source 206 is merely provided as an example configuration and is not intended to limit the scope of the application, including the scope of the claims. For example, in another embodiment where it is desirable to transmit AC power via the wireline cable 106, the power source 206 may comprise an inverter.

The example power source 206 comprises a rectifier 602 configured to receive AC power, convert the AC power to DC power, and output the DC power. The power source 206 also comprises a boosting transformer 604 configured to receive the DC power output by the rectifier 602 and to boost the DC output, creating a modified DC output. That is, stated differently, the boosting transformer 604 is configured to step up the DC voltage of the DC signal output by the rectifier 602. The boosting transformer 604 may further be configured to provide isolation between the power source 206 and the wireline cable 106 and/or other components of a surface unit 114 within which the power source 206 is comprised. In another embodiment, the power source 206 may comprise a transformer for providing isolation, but may not be configured to step-up and/or step-down the voltage of the DC signal output by the rectifier 602.

In some embodiments, the mode of power utilized for power transmission via the wireline cable 106 may be different than the mode of power utilized by one or more downhole tools comprised within the tool string 102. For example, it may be desirable to transmit DC power over the wireline cable, but some downhole tools may require AC power. In another embodiment, it may be desirable to transmit AC power over the wireline, but some downhole tools may require DC power. Still in other embodiments, the voltage of the power signal transmitted via the wireline cable 106 may be different than the desired voltage of one or more downhole tools.

Figure 7:
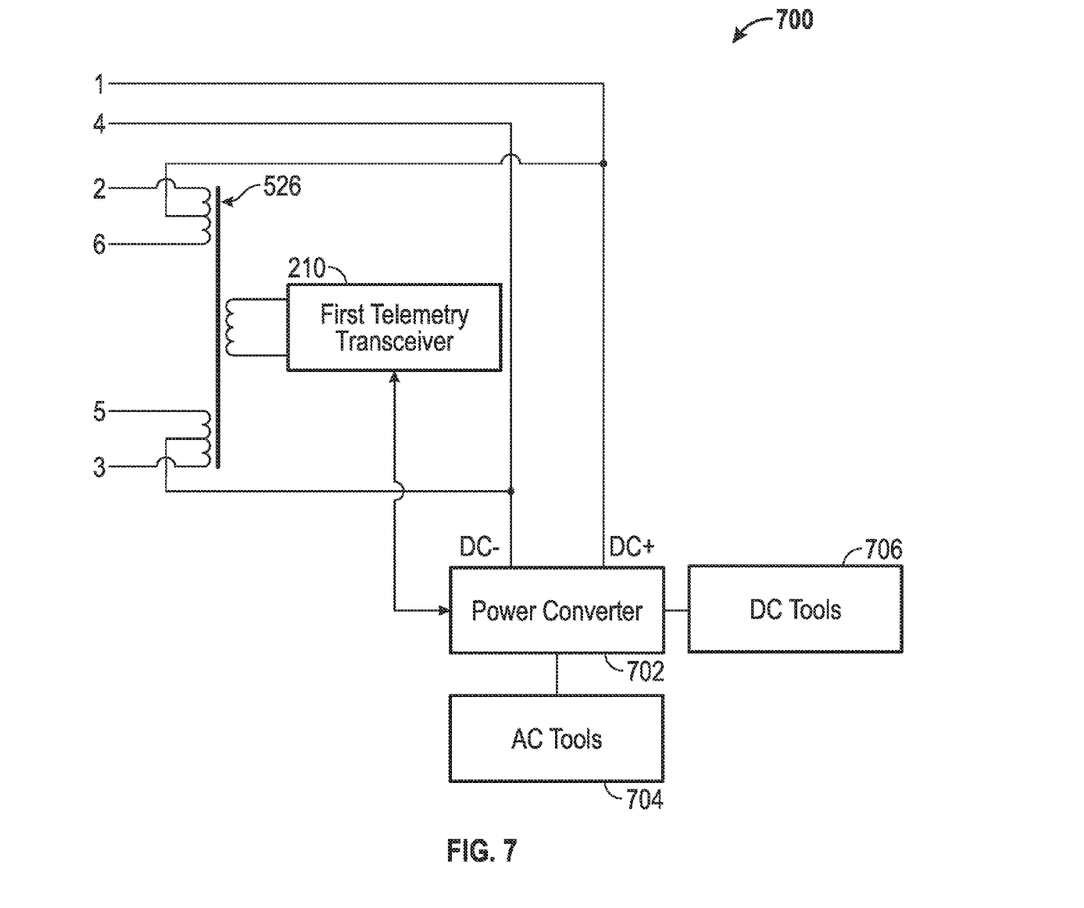
FIG. 7 illustrates an example environment for altering one or more power characteristics of a power signal transmitted downhole via a wireline cable.

FIG. 7 illustrates an example environment 700 for altering/changing one or more characteristics of the power signal transmitted downhole via the wireline cable 106 (or the primary conductors 302 of the wireline cable 106 as represented in FIG. 7 via the numerals 1-6). More specifically, FIG. 7 illustrates a downhole power converter 702 (e.g., comprised within the tool string 102) configured to alter/change one or more characteristics of the power signal. For example, the power converter 702 may be configured to receive the power signal transmitted over the wireline cable 106 and to output an altered power signal, wherein the altered power signal comprises at least one power characteristic (e.g., current, voltage, etc.) that is different than the power characteristics of the power signal transmitted over the wireline cable 106. For example, during a first period of time the power converter 702 may be configured to convert DC power transmitted over the wireline cable 106 to AC power and to supply the AC power to one or more AC tools 704 requiring AC power. During a second period of time, the power converter 702 may be configured to pass at least some of the DC power provided through the wireline cable 106 to DC tools 706 requiring DC power. The first period of time and the second period of time may be overlapping periods of time or non-overlapping periods of time.

It may be appreciated that the type of current is merely one of several power characteristics that may be altered and/or changed via the power converter 702. For example, in another embodiment, the power converter 702 may comprise a transformer configured to step-up or step-down a voltage of the power signal output by the power converter 702 relative to the voltage of the power signal provided to the power converter 702 via from the wireline cable 106. For example, one or more of the AC tools 704 and/or DC tools 706 may desire a lower voltage than the voltage of the power signal transmitted via the wireline cable 106. Therefore, the power converter 702 may be configured to transform at least a portion of the received power signal to meet the desired/specified voltage of the AC tool(s) 704 and/or DC tool(s) 706 desiring the lower voltage.

In the illustrated embodiment, the power converter 702 is connected to the first telemetry transceiver 210 of the tool string 102 and is configured to receive one or more power commands sent from the surface unit 114 to the tool string 102 via the first telemetry transceiver 210. That is, stated differently, power commands may be transmitted from the surface unit 114 (e.g., or rather from the first telemetry transceiver 204 of the surface unit 114) to the first telemetry transceiver 210 of the tool string 102. Moreover, feedback provided by the power converter 702 may be transmitted to the surface unit 114 via the first telemetry transceiver 210.

It may be appreciated that while specific reference is made herein to the first telemetry transceiver 210 being coupled to the power converter 702, in another embodiment, the second telemetry transceiver 504 may be coupled to the power converter 702 in addition to and/or as a substitute for the first telemetry transceiver 210 being coupled to the power converter 702.

While the use of the power converter 702 provides one example technique for generating two or more different power signals, in some embodiments it may be beneficial to periodically transmit two different power signals through the wireline cable 106. For example, the power converter 702 may consume valuable real estate on the tool string 102. As such, when two or more different power signals are required downhole (e.g., such as an AC-main power and an AC-auxiliary power and/or an AC power and a DC power), it may be beneficial to transmit the multiple power signals via the wireline cable 106 (e.g., as opposed to transmitting a single power signal through the wireline cable 106 and using a power converter downhole to generate the two or more different power signals from the single power signal transmitted through the wireline cable 106).

When two power signals are required to be concurrently transmitted over the wireline cable 106, a first set of primary conductors may be utilized to transmit a first power signal and a second set of primary conductors (e.g., different than the first set of primary conductors) may be utilized to transmit a second power signal. As an example, U.S. Pat. No. 7,259,689, assigned to Schlumberger Technology Corp. and the disclosure of which is incorporated herein by reference, describes using the first primary conductor 302-1 and the fourth primary conductor 302-4 to transmit an AC-main power signal. The second primary conductor 302-2, the third primary conductor 302-3, the fifth primary conductor 302-5, and the sixth primary conductor 302-6 may be utilized to transmit an AC-auxiliary power signal. When merely one power signal is required to be transmitted over the wireline cable 106 (e.g., at a time), the six primary conductors 302 may be utilized for transmitting the one power signal as described herein (e.g., where three primary conductors provide an active path and three primary conductors provide a return path for a power signal).

Figure 8:
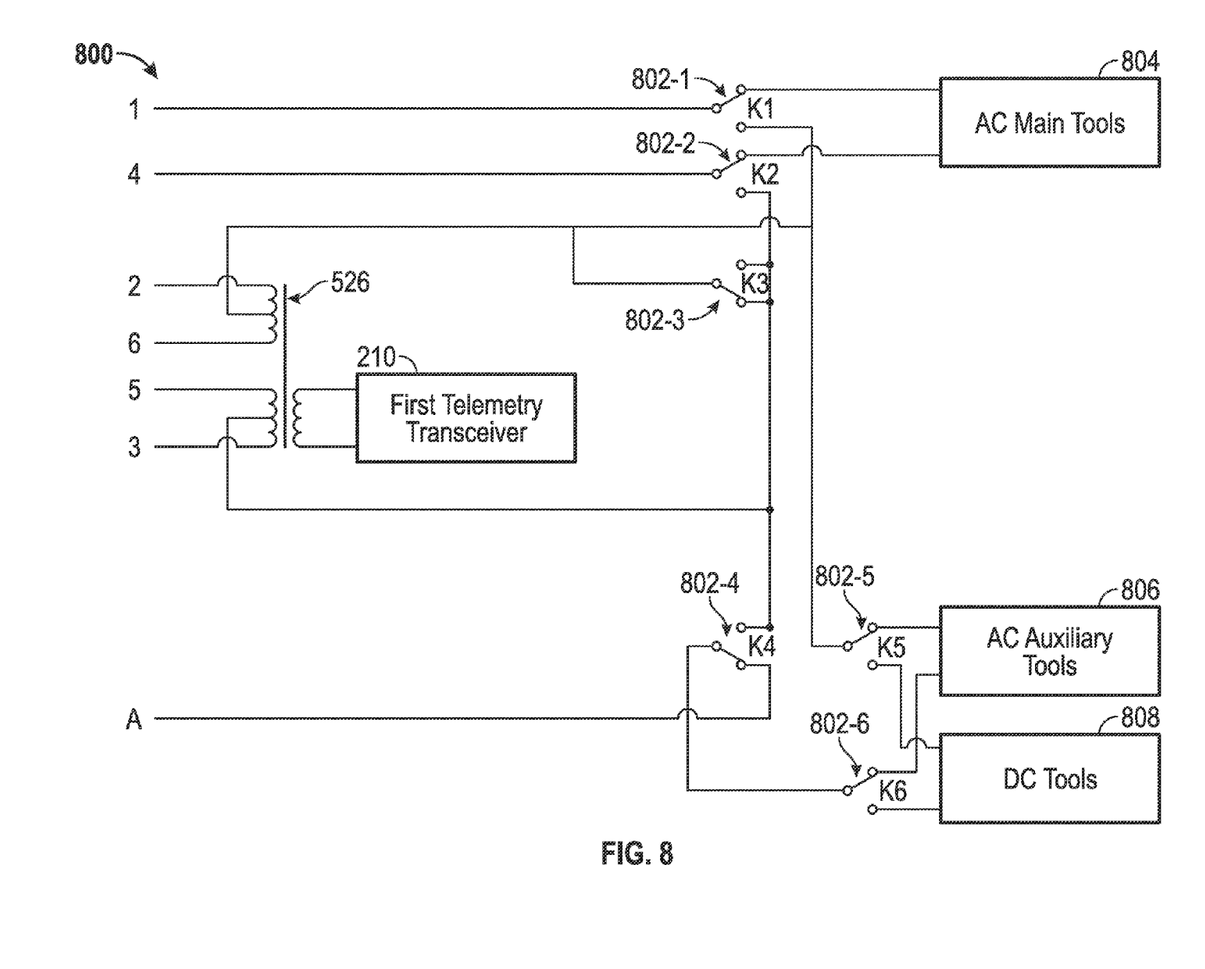
FIG. 8 illustrates an example environment for a downhole configuration for power delivery to downhole tools.

FIG. 8 illustrates an example environment 800 for a downhole tool string 102 configured to utilize one or more switching devices 802 to transition power connections when transitioning between concurrently sending two power signals via the wireline cable 106 and sending merely one power signal via the wireline cable 106. More specifically, FIG. 8 describes an example configuration where, during a first period of time, two AC power signals (e.g., an AC-main power signal and an AC-auxiliary power signal) are transmitted via the wireline cable 106 and, during a second period of time, a single DC power signal is transmitted via the wireline cable 106. As in FIG. 7, the primary conductors 302 of the wireline cable 106 are represented via the numerals 1-6. Armor 306 (e.g., which may be ground in some embodiments) is designated by the symbol A in the example environment 800.

The example configuration of the switching devices 802 describes the configuration of switches when concurrently transmitting two power signals via the wireline cable 106. Thus, the first switching device 802-1 (labeled K1) and the second switching device 802-2 (labeled K2) are in a position to provide a first power signal transmitted through the first primary conductor 302-1 and the fourth primary conductor 302-4 to AC main tools 804. Likewise, the third switching device 802-3 and the fifth switching device 802-5 are in a position to provide a second power signal transmitted through the second primary conductor 302-2, the third primary conductor 302-3, the fifth primary conductor 302-5, and the sixth primary conductor 302-6 to AC auxiliary tools 806. As such, power signals may be delivered to the AC main tools 804 using Mode 3 402-3 and/or Mode 6 402-6 (e.g., and/or a combination of Mode 3 402-3 and Mode 6 402-6) and/or power signals may be delivered to the AC auxiliary tools 806 using Mode 1 402-1 and/or Mode 4 402-4 (e.g., and/or a combination of Mode 1 402-1 and Mode 4 402-4). Due to, among other things, the positioning of the fourth switching device 802-4 and the sixth switching device 802-6 in FIG. 8 no power is provided to DC tools 808.

Figure 9:
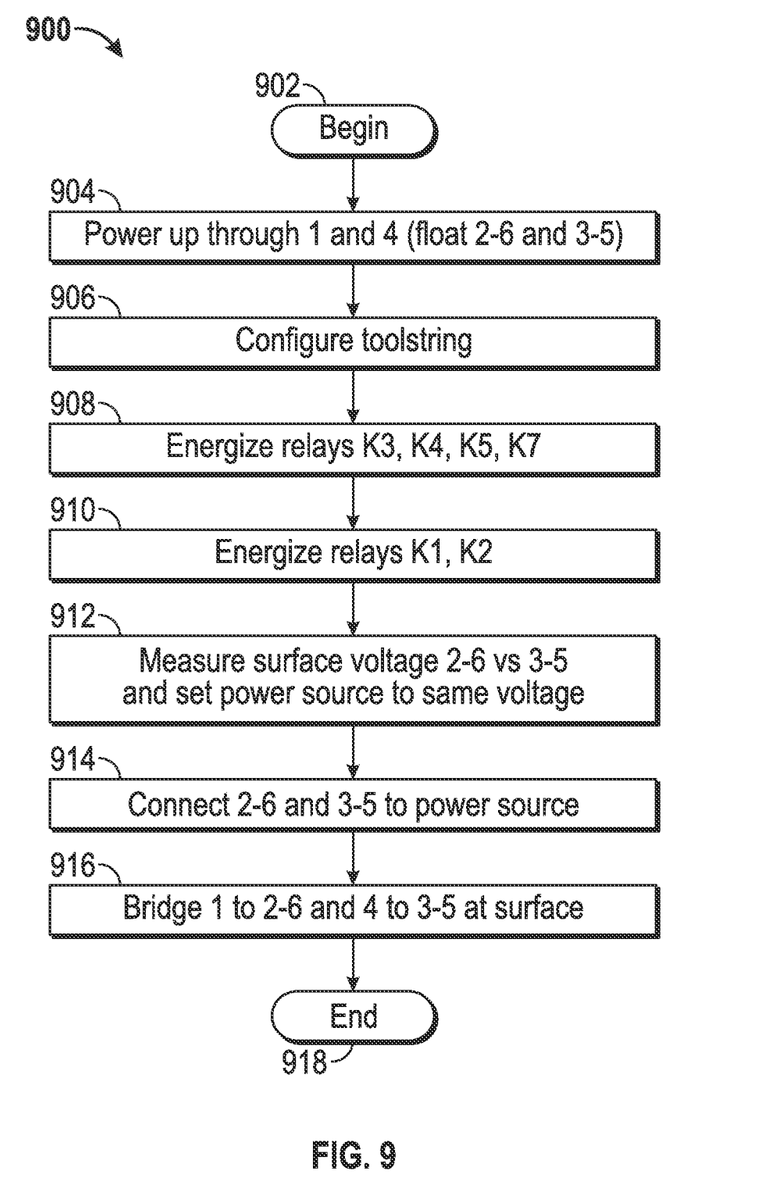
FIG. 9 illustrates an example sequence for delivering power to downhole tools.

FIG. 9 illustrates an example power-up sequence 900 for transitioning between concurrently sending the two power signals via the wireline cable 106 and concurrently sending merely one power signal via the wireline cable 106 using switching devices 802 as illustrated in FIG. 8. Such an example sequence 900 may be utilized to provide a power signal to DC tools 808 instead of providing power signals AC main tools 804 and AC auxiliary tools 806, for example.

The example sequence 900 begins at 902 when a command to initiate a transition between transmitting two power signals and transmitting a single power signal via the wireline cable 106 is received (e.g., at the surface unit 114). For example, the transition may comprise transitioning between transmitting two different AC power signals to transmitting a single DC power signal. Initially, as part of the sequence, power signals may cease being sent through the wireline cable 106.

At 904 in the example sequence 900, the single power signal (e.g., the DC signal) is transmitted through the first primary conductor 302-1 and the fourth primary conductor 302-4 to power up a portion the tool string 102 (e.g., for configuration and sending the relay positioning commands to the surface unit via the first telemetry transceivers 204, 210 and/or via the second telemetry transceivers 502, 504). That is, stated differently, a desired power signal is transmitted through the first primary conductor 302-1 and the fourth primary conductor 302-4. It may be appreciated that the load to which the desired power signal is sent is configured to support the load (e.g., at least temporarily). Thus, in the illustrated embodiment, the AC main tools 804 may be configured to at least temporarily support the DC signal (e.g., and function off of the DC signal). That is, for example, under telemetry command, a portion of the wireline cable 106 is configured for AC transmission (e.g., by taking advantage of one or telemetry transceivers 502, 504 configured to operate via both AC signals and DC signals). By way of example, one or more of the AC main tools 804 may comprise a converter configured to convert an incoming DC signal to an AC signal when the signal transmitted via the wireline is a DC signal and the AC main tools 804 are configured to operate using an AC signal. The second primary conductor 302-2, third primary conductor 302-3, fifth primary conductor 302-5, and sixth primary conductor 302-6 may be left floating at the surface unit.

At 906 in the example sequence 900, the tool string 102 is configured. For example, one or more tools 102 of the tool string that are receiving power via the single power signal may be configured to provide identification and/or status information to the surface unit 114 via the first telemetry transceivers 204, 210 and/or the second telemetry transceivers 502, 504. In this way, the surface unit 114 may verify that the tools are present and ready to operate, for example.

At 908 in the example sequence 900, switching devices 802-3, 802-4, 802-5, and 802-6 (e.g., labeled K3, K4, K5, and K6 respectively) are energized. In this way, the AC auxiliary tools 806 are disconnected from the wireline cable 106 at the downhole side of the wireline assembly and the DC tools 808 are connected to the second primary conductor 302-2, the third primary conductor 302-3, the fifth primary conductor 302-5, and the sixth primary conductor 302-6.

At 910 in the example sequence 900, switching devices 802-1 and 802-2 (e.g., labeled K1 and K2 respectively) are energized. In this way, the first primary conductor 302-1 and the fourth primary conductor 302-4 are connected to the DC tools 808 at the downhole side of the wireline assembly, thus connecting the six primary conductors 302 of the wireline cable 102 to the DC tools 808.

At 912 in the example sequence 900, the surface voltage of the second primary conductor 302-2 and the sixth primary conductor 302-6 and the surface voltage of the third primary conductor 302-3 and the fifth primary conductor 302-5 are measured and the power source 206 is set to output a substantially same voltage to the second primary conductor 302-2, the third primary conductor 302-3, the fifth primary conductor 302-5, and the sixth primary conductor 302-6.

At 914 in the example sequence 900, the second primary conductor 302-2, the third primary conductor 302-3, the fifth primary conductor 302-5, and the sixth primary conductor 302-6 are connected to the power source 206 at the surface unit 114. At 916 in the example sequence 900, the second primary conductor 302-2 and the sixth primary conductor 302-6 are bridged to the first primary conductor 302-1 at the surface unit 114 and the third primary conductor 302-3 and the fifth primary conductor 302-5 are bridged to the fourth primary conductor 302-4 at the surface unit 114. In this way, the six primary conductors 302 are configured, at the surface unit, to provide a single power signal through the wireline cable 106.

The example sequence 900 ends at 918.

Figure 10:
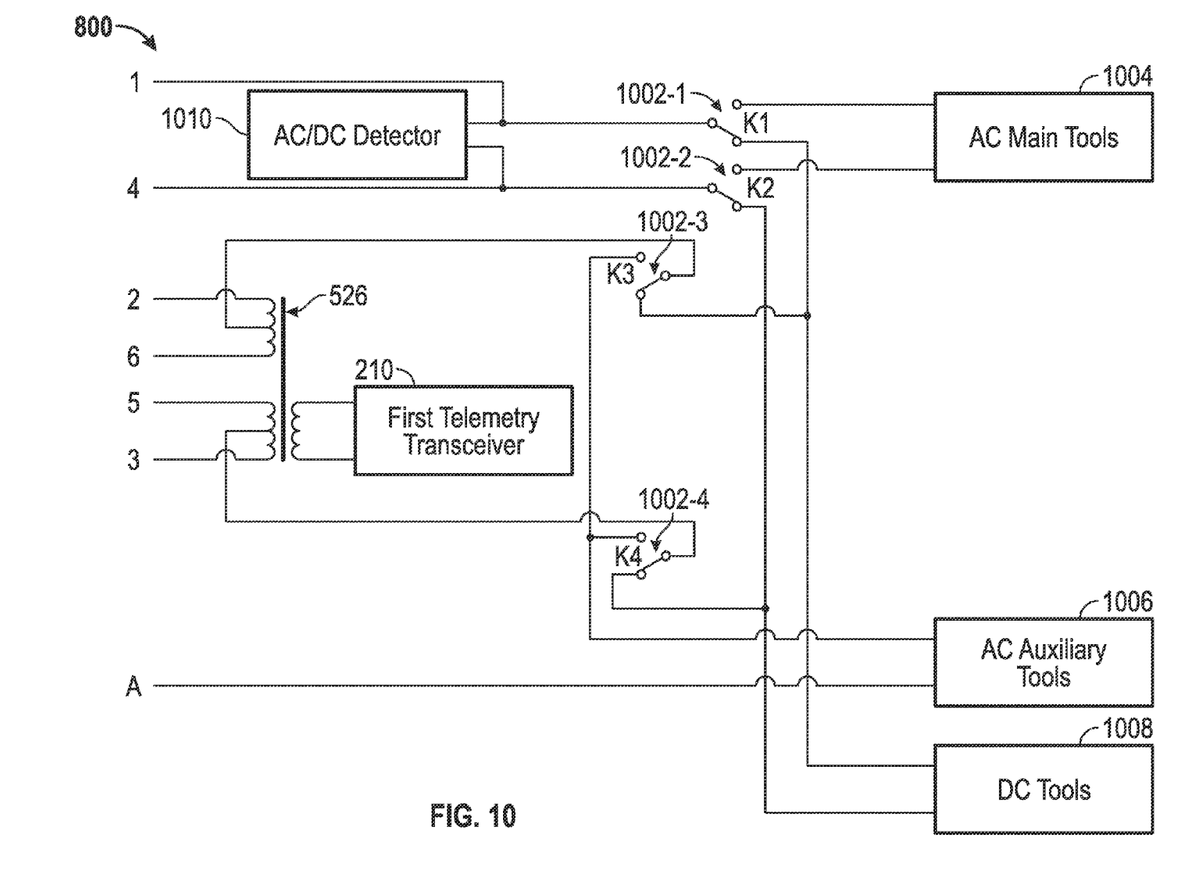
FIG. 10 illustrates an example environment for a downhole configured for power delivery to downhole tools.

FIG. 10 illustrates yet another example environment 1000 for a downhole tool string 102 configured to utilize one or more switching devices 1002 to transition power connections when transitioning between concurrently sending two power signals via the wireline cable 106 and sending merely one power signal via the wireline cable 106. More specifically, FIG. 10 describes an example configuration where, during a first period of time, two AC power signals (e.g., an AC-main power signal configured to supply power to the AC main tools 1004 and an AC-auxiliary power signal configured to supply power to the AC auxiliary tools 1006) are transmitted via the wireline cable 106 and, during a second period of time, a single DC power signal is transmitted via the wireline cable 106 (e.g., to supply power to the DC tools 1008). As in FIG.

7, the primary conductors 302 of the wireline cable 106 are represented via the numerals 1-6. Armor 306 (e.g., which may be ground is some embodiment) is designated by the symbol A in the example environment.

The example configuration of the switching devices 1002 describes the configuration of switches when delivering power to merely the DC tools 1008. Thus, a first switching device 1002-1 (labeled K1) and a second switching device 1002-2 (labeled K2) are in a position to provide an active path for the DC signal, while a third switching device 1002-3 (e.g., labeled K3) and a fourth switching device 1002-4 (e.g., labeled K4) are in a position to provide a return path for the DC signal (e.g., such as described with respect to Mode 8 406). Thus, no power is delivered to the AC main tools 1004 and/or the AC auxiliary tools 1006, for example In the example environment 1000, an AC/DC detector 1010 is electrically coupled to the first primary conductor 302-1 and/or the fourth primary conductor 302-4. The AC/DC detector 1010 is configured to detect a change in current from alternating to direct and/or from direct to alternating, and is configured to initiate a switching of the switching devices 1002 from a first position to a second position based upon a change in current between alternating and direct. In this way, when an AC current is detected by the AC/DC detector 1010, the switching devices 1002 are switched from the illustrated configuration, causing the first switching device 1002-1 and the second switching device 1002-2 to electrically couple the first primary conductor 302-1 and the fourth primary conductor 302-4, respectively, to the AC main tools 1004. Moreover, detection of an AC current by the AC/DC detector 1010 may cause the third switching device 1002-3 to electrically couple the second primary conductor 302-2 and the sixth primary conductor 302-6 to the AC auxiliary tools 1006 and may cause the fourth switching device 1002-4 to electrically couple the third primary conductor 302-3 and the fifth primary conductor 302-5 to the AC auxiliary tools 1006, for example. In one embodiment, armor 306 may provide a return path (e.g., or a ground) for power signals provided to the AC auxiliary tools 1006, for example. As such, power signals may be delivered to the AC main tools 1004 using Mode 3 402-3 and/or Mode 6 402-6 (e.g., and/or a combination of Mode 3 402-3 and Mode 6 402-6) and/or power signals may be delivered to the AC auxiliary tools 1006 using Mode 1 402-1 and/or Mode 4 402-4 (e.g., and/or a combination of Mode 1 402-1 and Mode 4 402-4).

It may be appreciated that when power is delivered to the AC main tools 1004 and/or the AC auxiliary tools 1006, the switching devices 1002 may not be configured to provide power to the DC main tools 1008 (e.g., although telemetry signals may still be transmitted to the first telemetry transceiver 210 using a different propagation mode than utilized to transmit the power to the AC main tools 1004 and/or to the AC auxiliary tools 1006 as described above), for example.

Figure 11:
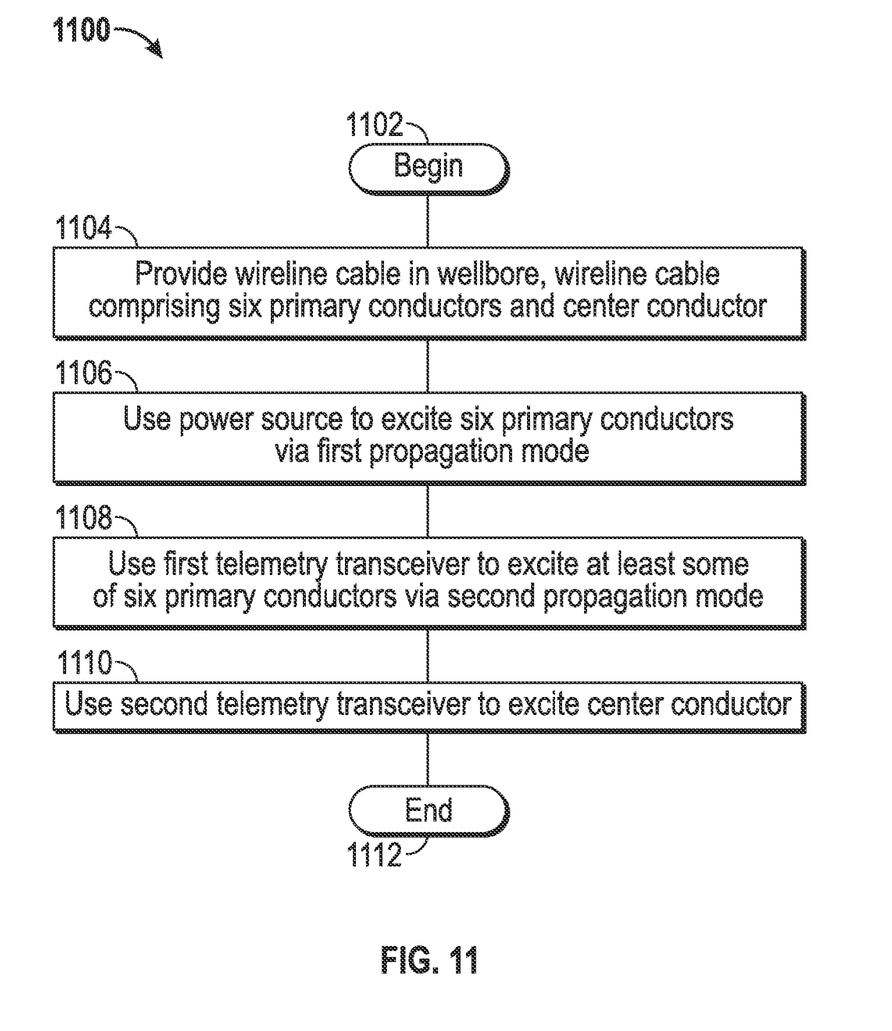
FIG. 11 is a flow diagram illustrating an example method as set forth herein.

FIG. 11 illustrates an example method 1100 for transmitting a power signal and a telemetry signal over a wireline cable. The method begins at 1102, and a wireline cable is provided (e.g., inserted) into a wellbore at 1104. As described with respect to FIG. 3, the wireline cable may be a heptacable comprising six primary conductors and a center conductor.

At 1106 in the example method 1100, a power source is used to excite the six primary conductors via a first propagation mode, and at 1108 a first telemetry transceiver is used to excite at least some of the six primary conductors via a second propagation mode, the second propagation mode different than the first propagation mode. For example, returning to FIG. 4, the power source may be configured to excite the six primary conductors according to Mode 8 406, and the first telemetry transceiver may be configured to excite at least some of the six primary conductors according to Mode 5 402-5. However, other natural propagation modes and/or derivatives of such natural propagation modes may be utilized be the power source and/or the first telemetry transceiver to excite at least some of the six primary conductors. In one embodiment, the propagation mode utilized by the power source may be orthogonal to the propagation mode utilized by the first telemetry transceiver to reduce (e.g., to a minimum) cross-talk between a first telemetry signal and a power signal, for example.

In one embodiment, a first transformer is used to couple the first telemetry transceiver and/or the power source to the wireline cable. By way of example, as illustrated in FIG. 5, a first transformer may comprise a first primary winding and a pair of secondary windings (e.g., a first secondary winding and a second secondary winding). Two of the six primary conductors may be connected to terminals of the first secondary winding, another two of the six primary conductors may be connected to terminals of a second secondary winding of the transformer, another one of the six primary conductors may be connected to a center tap of the first secondary winding, and another one of six primary conductors is connected to a center tap of the second secondary winding. The first telemetry transceiver may be connected to the first primary winding of the transformer and the power source may be connected to the center tap of the first secondary winding and to the center tap of the second secondary winding. In this way, both power signals and telemetry signals may be transmitted through the pair of secondary windings, while merely telemetry signals are transmitted through the first winding, for example.

At 1110 in the example method 1100, a second telemetry transceiver is used to excite at least the center conductor (e.g., using a third propagation mode.

The example method 1100 ends at 1112.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

What is claimed is:

1. A wireline assembly, comprising:
 a wireline cable comprising six primary conductors and a center conductor;
 a power source to excite the six primary conductors using a first propagation mode, wherein the first propagation mode provides for three of the six primary conductors providing an active path for a power signal generated by the power source and a different three of the six primary conductors providing a return path for the power signal, the three primary conductors providing the active path being adjoining and the three primary conductors providing the return path being adjoining;
 a first telemetry transceiver to excite at least some of the six primary conductors using a second propagation mode, the second propagation mode different than the first propagation mode; and
 a second telemetry transceiver to excite the center conductor.

2. The assembly of claim 1, wherein the first propagation mode is orthogonal to a second propagation mode.

3. The assembly of claim 1, wherein the second propagation mode provides for a first pair of the six primary conductors providing an active path for a telemetry signal generated by the first telemetry transceiver and a second pair of the six primary conductors providing a return path for the telemetry signal, a first primary conductor of the first pair diametrically opposite a second primary conductor of the first pair relative to the center conductor and a first primary conductor of the second pair diametrically opposite a second primary conductor of the second pair relative to the center conductor.

4. The assembly of claim 1, wherein the six primary conductors are equal in magnitude.

5. The assembly of claim 1, wherein the first propagation mode is a combination of two or more natural propagation modes.

6. The assembly of claim 1, wherein the first telemetry transceiver is connected to a first primary winding of a first transformer and wherein the power source is connected to a center tap of a first secondary winding of the first transformer.

7. The assembly of claim 6, wherein the second telemetry transceiver is connected to a second primary winding of a second transformer and wherein a third secondary winding of the second transformer corresponds to the center conductor.

8. The assembly of claim 6, wherein the first transformer comprises a second secondary winding, terminals of the first secondary winding connected to a first pair of the six primary conductors and terminals of the second secondary winding connected to a second pair of the six primary conductors, the first pair of primary conductors different than the second pair of primary conductors.

9. The assembly of claim 8, wherein a first primary conductor is connected to the center tap of the first secondary winding and a fourth primary conductor is connected to a center tap of the second secondary winding, the first pair of primary conductors comprising a second primary conductor and a sixth primary conductor and the second pair of primary conductors comprising a third primary conductor and a fifth primary conductor.

10. The assembly of claim 1, comprising a downhole converter to convert at least a portion of DC power supplied via the wireline cable to AC power for powering one or more evaluation tools.

11. A wireline assembly, comprising:
a set of primary conductors positioned around a circumference of a center conductor, the set of primary conductors comprising a first primary conductor, a second primary conductor, a third primary conductor, a fourth primary conductor, a fifth primary conductor, and a sixth primary conductor;
a first transformer comprising a first primary winding, a first secondary winding, and a second secondary winding,
terminals of the first secondary winding connected to the second primary conductor and the sixth primary conductor,
terminals of the second secondary winding connected to the third primary conductor and the fifth primary conductor,
a center tap of the first secondary winding connected to the first primary conductor, and
a center tap of the second secondary winding connected to the fourth primary conductor;
a first power source connected to the center tap of the first secondary winding and the center tap of the second secondary winding; and
a first telemetry transceiver connected to the first primary winding of the first transformer.

12. The assembly of claim 11, wherein:
the first primary conductor is spatially adjacent the second primary conductor and the sixth primary conductor; and
the fourth primary conductor is spatially adjacent the third primary conductor and the fifth primary conductor.

13. The assembly of claim 11, wherein the first primary conductor, the second primary conductor, and the sixth primary conductor provide an active path for a power signal generated by the power source and the third primary conductor, the fourth primary conductor, and the fifth primary conductor provide a return path for the power signal.

14. The assembly of claim 13, wherein the second primary conductor and the fifth primary conductor provide an active path for a first telemetry signal generated by the first telemetry transceiver and the third primary conductor and the sixth primary conductor provide a return path for the first telemetry signal.

15. The assembly of claim 11, comprising:
a second transformer comprising a second primary winding and a third secondary winding; and
a second telemetry transceiver connected to the second primary winding, the third secondary winding corresponding to the center conductor.

16. The assembly of claim 15, wherein the center conductor provides an active path for a second telemetry signal generated by the second telemetry transceiver.

17. The assembly of claim 16, wherein the set of primary conductors provide a return path for the second telemetry signal.

18. A method of transmitting a power signal and a telemetry signal, comprising:
providing a wireline cable in a wellbore, the wireline cable comprising six primary conductors and a center conductor;
using a power source to excite the six primary conductors via a first propagation mode;
using a first telemetry transceiver to excite at least some of the six primary conductors via a second propagation mode, the second propagation mode different than the first propagation mode; and
using a second telemetry transceiver to excite the center conductor.

19. The method of claim 18, comprising using a transformer to couple the first telemetry transceiver to the wireline cable, wherein:
the first telemetry transceiver is connected to a primary winding of the transformer,
two of the six primary conductors are connected to terminals of a first secondary winding of the transformer,
another two of the six primary conductors are connected to terminals of a second secondary winding of the transformer,
another one of the six primary conductors is connected to a center tap of the first secondary winding,
another one of six primary conductors is connected to a center tap of the second secondary winding, and
the power source is connected to the center tap of the first secondary winding and to the center tap of the second secondary winding.

* * * * *